No. 614,053.　　　　　　　　　　　　　　　　　　Patented Nov. 8, 1898.
S. T. JOHNSON.
CIRCULAR SAW.
(Application filed June 24, 1898.)
(No Model.)
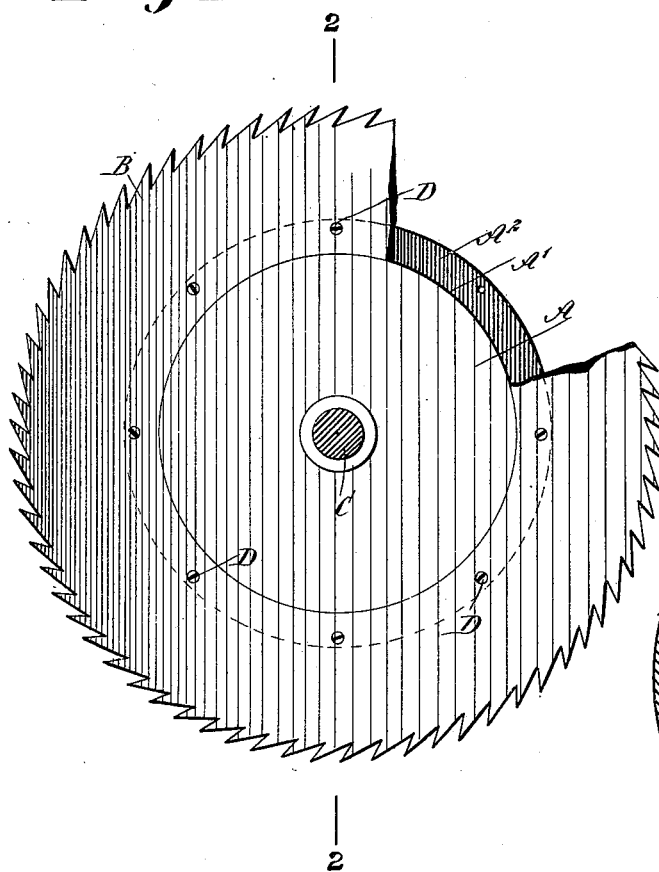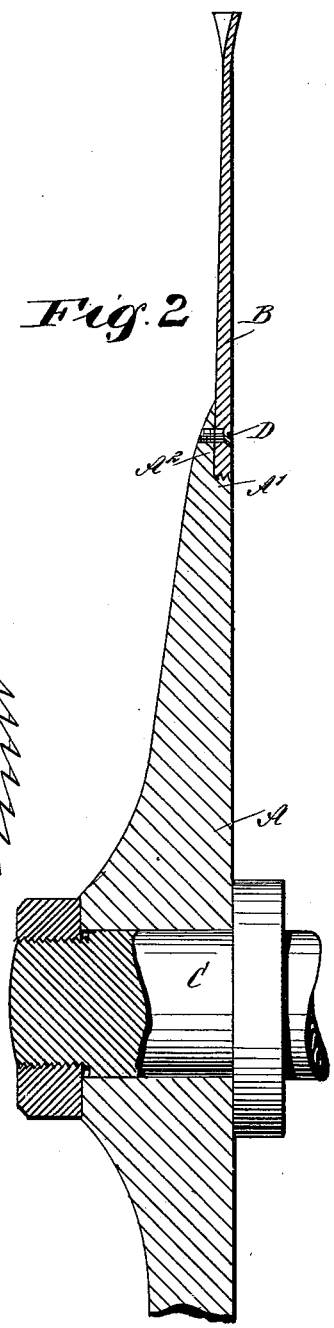
WITNESSES:
INVENTOR
S. T. Johnson
BY
ATTORNEYS.

UNITED STATES PATENT OFFICE.

SIEVE THEODOR JOHNSON, OF TRINIDAD, CALIFORNIA.

CIRCULAR SAW.

SPECIFICATION forming part of Letters Patent No. 614,053, dated November 8, 1898.

Application filed June 24, 1898. Serial No. 684,338. (No model.)

*To all whom it may concern:*

Be it known that I, SIEVE THEODOR JOHNSON, of Trinidad, in the county of Humboldt and State of California, have invented a new and Improved Circular Saw, of which the following is a full, clear, and exact description.

The object of the invention is to provide a new and improved circular saw which is simple and durable in construction, very effective in operation, and more especially designed for sawing shingles and the like and arranged with a removable cutting-section to permit of readily and conveniently removing said section from the central spindle-section and replacing it by a new one in case the cutting-section is worn out or broken.

The invention consists of novel features and parts and combinations of the same, as will be fully described hereinafter and then pointed out in the claim.

Reference is to be had to the accompanying drawings, forming a part of this specification, in which similar characters of reference indicate corresponding parts in both figures.

Figure 1 is a face view of the improvement with part of the outer cutting-section broken away, and Fig. 2 is an enlarged cross-section of the same on the line 2 2 of Fig. 1.

The improved circular saw is made in two sections A and B, of which the inner central section A is adapted to be secured to the spindle or arbor C, and the outer section B is made ring-shaped with teeth at the peripheral edge, the thickness of the section decreasing from the inner edge to the outer toothed edge as is plainly indicated in Fig. 2.

On the face of the inner section A is formed a boss $A'$, formed on its periphery with a screw-thread on which screws a corresponding thread formed on the inner end of the outer ring-section B. Thus when the section B is screwed on the boss $A'$ the faces of the sections A and B are flush with each other, as is plainly indicated in Fig. 2, and the inner portion of the outer section B rests with its under side or top on an annular flange $A^2$, projecting outward from the boss $A'$. Bolts, rivets, or like fastening devices D are employed for fastening the inner portion of the section B to the flange $A^2$ after the outer section has been screwed upon the boss $A'$. Thus the two sections are securely united, and the outer section can be readily removed from the inner section whenever desired by first removing the screws, rivets, or like devices D and unscrewing the section from the boss $A'$. A new section can then be placed on the section A.

By the arrangement described the outer section B can be made comparatively narrow, especially as the saw is only intended for sawing shingles and the like.

The saw can be cheaply manufactured, as by the use of a large inner section A the outer cutting-section B can be made very narrow, and as this is the most expensive part of the saw it is evident that the cost of manufacturing is reduced to a minimum. Furthermore, in case such outer section is worn out it can be replaced by a new one on the same inner section or center.

By having the heavy central section A the section B can be made comparatively thin without danger of springing, as said section is partly supported on the flange $A^2$ of the inner section A.

Having thus fully described my invention, I claim as new and desire to secure by Letters Patent—

A circular saw comprising a central section having a peripheral screw-thread and a flange projecting radially beyond said screw-thread, in combination with a rim-section having saw-teeth at its outer periphery, and a female screw-thread at its inner periphery, fitting the screw-thread on the central section, and securing devices such as screws extending through said rim and flange in a direction parallel to the axis.

SIEVE THEODOR JOHNSON.

Witnesses:
   ANNIE L. DAY,
   W. W. STONE.